UNITED STATES PATENT OFFICE.

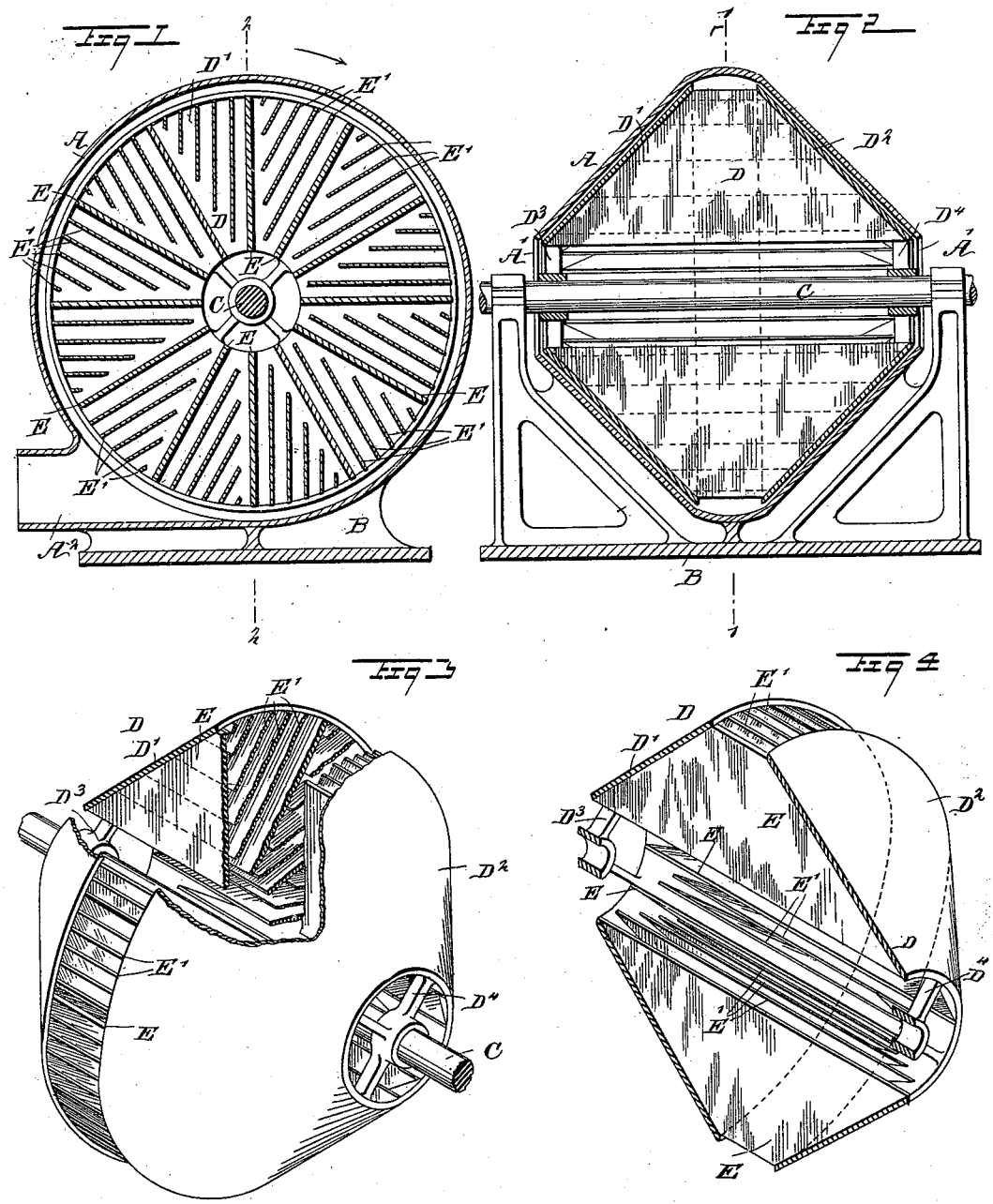

WILLIAM HENRY HARRISON, OF NEWARK, NEW JERSEY.

CENTRIFUGAL BLOWER.

SPECIFICATION forming part of Letters Patent No. 523,935, dated July 31, 1894.

Application filed April 25, 1893. Serial No. 471,764. (No model.)

*To all whom it may concern:*

Be it known that I, WILLIAM HENRY HARRISON, of Newark, in the county of Essex and State of New Jersey, have invented a new and Improved Centrifugal Blower, of which the following is a full, clear, and exact description.

The object of the invention is to provide a new and improved centrifugal blower, which is simple and durable in construction, very effective in operation, and arranged to form a proper outlet for the air from the fan wheel, to prevent undesirable compression of air in the wheel and consequent friction and loss of power.

The invention consists of a fan wheel having a series of plane radial main vanes forming a passage for the air from the central opening of the wheel to the periphery thereof, and a set of auxiliary vanes for each main vane and arranged parallel thereto and extending from the periphery of the wheel to within a short distance of the next following main vane.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional side elevation of the improvement on the line 1—1 of Fig. 2. Fig. 2 is a cross section of the same on the line 2—2 of Fig. 1. Fig. 3 is a perspective view of the fan wheel with parts broken out; and Fig. 4 is a sectional perspective view of the same.

The improved blower is provided with a blower casing A, preferably made in the shape of two conical disks united with each other at their bases, the apexes of the said disk being formed with air inlet openings A', as plainly shown in Fig. 2. The casing A is supported on a suitably-constructed frame B and through the openings A' extends centrally the shaft C journaled in suitable bearings attached to or forming part of the frame A.

Within the casing A is arranged a fan wheel D having its ends made in the shape of conical disks D' and D², corresponding to the shape of the disks of the casing A, so as to lie close to the interior surface of the said casing, as will be readily understood by reference to Fig. 2. The apexes of the disks D' and D² are formed with openings corresponding to the openings A' of the casing A, and the said disks are attached near their apexes to spiders D³ and D⁴ respectively, secured on the main driving shaft C, so that the air can freely enter through the registering openings in the casing A, and the disks D' and D², to pass to the interior of the fan wheel D. The latter is provided between the disks D' and D² with a series of main vanes E connecting the disks with each other and extending from the openings in the apexes of the disks to their periphery, as will be readily understood by reference to Fig. 1. Two succeeding main vanes E form a passage for the air from the central opening of the wheel to the periphery thereof, it being understood that the bases of the disks D' and D² are located a suitable distance apart, as shown in Fig. 2. In each of the air passages thus formed between the two succeeding vanes E, are arranged a number of auxiliary vanes E', extending parallel to one of the said vanes and extending from one disk D' to the other disk D², the said vanes extending from the periphery of the fan wheel to within a short distance of the next main vane, so as to leave an air passage between this vane and the ends of the auxiliary vanes E' in each of the air passages above referred to.

The current or blast created by the rotation of the fan wheel D is discharged from the blower casing A at the perimeter of the casing, and for this purpose a tubular neck or mouth A² is formed on the said casing A, set substantially tangential to the said casing, as will be readily understood by reference to Fig. 1.

Now, it will be seen that when the main shaft C is rotated, air is drawn to the fan wheel D through the openings A' in the casing A, and the openings in the disks D' and D², to pass into the air passages formed between the radial vanes E, it being understood that the air in its outward movement in each of the said passages, passes into the air spaces formed between two succeeding individual auxiliary vanes E', to finally discharge the air into the casing A and through the neck or mouth A².

By reference to Fig. 1, it will be seen that the auxiliary vanes E' on account of being arranged parallel to one of the main vanes in the corresponding air passage, decrease in size both in length and width, so that their inner ends increase in distance from the center of the wheel, whereby the area of each of the auxiliary vanes is successively decreased, it being understood that the decrease of the vanes commences from the auxiliary vane next to its parallel main vane, so that finally the smallest auxiliary vane is the one nearest the periphery of the fan wheel and next to the succeeding main vane E. It will be seen that by this arrangement, the air passing up the space between the ends of the auxiliary vanes E' and the next main vane E, can readily pass into the passages formed by the parallel auxiliary vanes, to readily discharge the air at the periphery of the fan wheel, so that no undesirable compression of air in the wheel can take place, and a consequent reduction of friction follows, so that there is no loss of the power applied.

Having thus fully described my invention, I claim as new and desire to secure by Letters Patent—

1. In a centrifugal blower, a fan wheel having a series of plane, radially diverging main vanes, forming passages for the air from the center of the wheel to the periphery thereof, and a set of auxiliary vanes for each main vane and arranged parallel thereto, and extending from the periphery of the wheel to within a short distance of the next following main vane, so as to produce a radial passage along the said main vane, and a series of parallel passages branching off from the said radial passage, substantially as described.

2. In a centrifugal blower, a fan wheel consisting of two frusto-conical end pieces placed with their bases adjacent and parallel to each other, and with their contracted ends facing in opposite directions, trapezoidal main vanes secured between the said end pieces, and auxiliary vanes extending between the end pieces from the bases thereof to within a distance from the contracted ends of the end pieces, the said auxiliary vanes being arranged in step-like fashion between each two main vanes, substantially as described.

WILLIAM HENRY HARRISON.

Witnesses:
  THEO. G. HOSTER,
  C. SEDGWICK.